(No Model.)

J. M. MILLER.
THILL COUPLING.

No. 314,463. Patented Mar. 24, 1885.

WITNESSES:
Wm Duvall
J. L. Fracker

INVENTOR:
James M. Miller,
BY E. B. Stocking
ATTORNEY.

UNITED STATES PATENT OFFICE.

JAMES M. MILLER, OF ALLENTOWN, PENNSYLVANIA.

THILL-COUPLING.

SPECIFICATION forming part of Letters Patent No. 314,463, dated March 24, 1885.

Application filed December 15, 1884. (No model.)

*To all whom it may concern:*

Be it known that I, JAMES M. MILLER, a citizen of the United States, residing at the city of Allentown, in the county of Lehigh and State of Pennsylvania, have invented certain new and useful Improvements in Thill-Couplings, of which the following is a specification, reference being had to the accompanying drawings.

This invention has relation to improvements in thill-couplings of that class where a locking-key and wedge are employed to connect the shank of a shaft with a U-shaped coupling-strap; and the invention consists of certain features of construction hereinafter set forth, and specifically pointed out in the claim.

Figure 1:
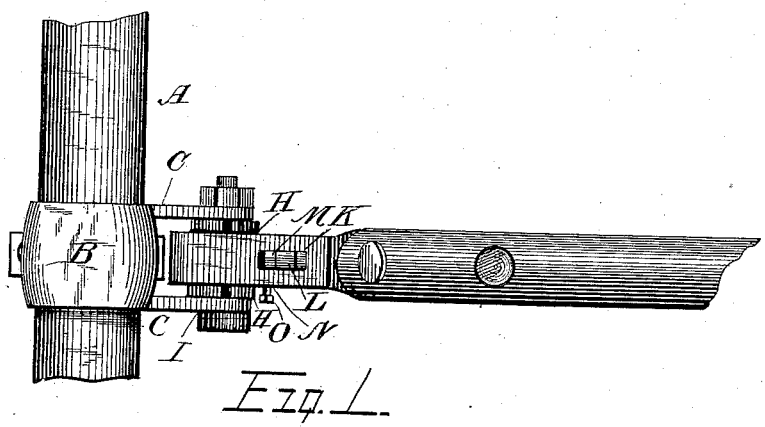
Figure 2:
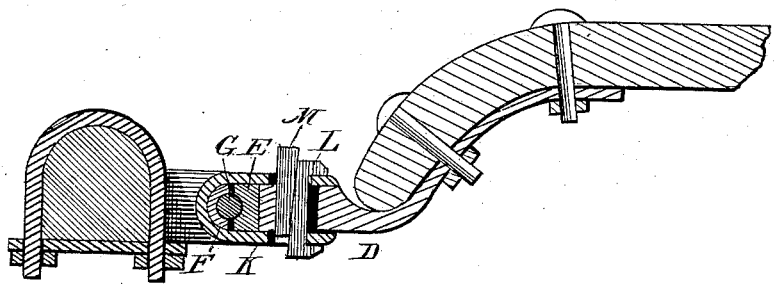
Figures 3, 4:
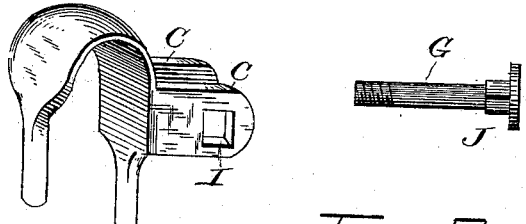

Referring to the drawings, Figure 1 is a plan view of a thill-coupling provided with my improvements. Fig. 2 is a central vertical longitudinal section of the same, and Figs. 3 and 4 are details hereinafter referred to.

Like letters indicate like parts in all the figures.

A represents the axle of a vehicle, and B the clip, which is provided with the bifurcation C.

D represents the rear end or shank-iron of a pole or shaft, which is of the usual construction.

E and F represent half-boxes, which are bored to form bearings for the bolt G, said boxes being provided with flanges H.

One of the arms C of the clip B is provided with a square aperture, I, (see Fig. 3,) for the reception of the square portion of the bolt G, which fits the aperture I. The half-box F is rounded at its rear end, so as to agree with the contour of the strap K, and the other half-box, E, is square and abuts against the flat end of the shank D of the shaft. The boxes E and F being placed in position within the strap K, as clearly shown in Figs. 1 and 2, the bolt or coupling-pin G is inserted, the opposite end of which is screw-threaded for the reception of a nut. Each arm of the strap K is slotted longitudinally, said slots registering with a similar slot in the shank D, into which a rectangular key, L, is inserted, after which a locking or wedge-shaped key, M, is driven.

The shank D of the shaft is provided with a screw-threaded aperture, N, opposite the locking-key M, for the reception of a set-screw, O, which impinges against said locking key or wedge M, and thus prevents it from being jolted out of position.

Should the bearings of the half-boxes become worn, they can be removed and a new set readily inserted by loosening the screw O, removing the keys M and L, and withdrawing the shaft. It will thus be seen that the only parts of the coupling that wear are the bolt and the boxes or bearings, either of which may be easily replaced.

By reference to Figs. 1 and 2 it will be seen that there is a space between the inner edges of the boxes, so that as the bolt G and the boxes wear such wear may be taken up by loosening the screw O and driving the wedge M farther down into the slots, which will force the end of the shank D against the half-box E and draw the strap K forward, so as to bind the two boxes tightly together, thus making a snug substantially new bearing. By reason of the bolt G being formed with the square portion J all wear of the clips is obviated.

I do not broadly claim the application of wedge-shaped keys and a strap to a thill-coupling, as these have heretofore been employed, but always with rubber or other flexible packing about the bolt where the greatest wear comes; and heretofore the wedges have not been securely fastened against displacement when in use, which is much more liable to occur when such flexible or yielding packing is employed.

I am also aware that it is a common expedient to employ square-bodied bolts to prevent their turning; but in this case I secure an advantage special in its nature when metallic half-boxes are employed, in that a rear portion (in line of draft) of said bolt, which takes the main strain in wear, may, by a quarter-turn of the bolt in its square seat I, be thrown out of use and a true and not so much, if any, worn portion brought to bear the greatest strain, thus aiding greatly in the preservation of uniform and smooth action of the parts upon each other.

Having described my invention and its operation, what I claim is—

A thill-coupling consisting of the clip B, one of the arms of which is provided with the square aperture I, the bolt G, having the square body portion J, the half-boxes E F, the slotted strap K, the slotted shank D, provided with the set-screw O, the key L, and the wedge M, substantially as shown and described.

In testimony whereof I affix my signature in presence of two witnesses.

JAMES M. MILLER.

Witnesses:
 JACOB D. BURGER,
 EDWARD H. RENINGER.